United States Patent [19]

Holze

[11] 4,126,359
[45] Nov. 21, 1978

[54] TORSIONAL TRACK BUSHING

[75] Inventor: Gordon H. Holze, Chillicothe, Ill.

[73] Assignee: Caterpillar Tractor Co., Peoria, Ill.

[21] Appl. No.: 806,810

[22] Filed: Jun. 15, 1977

[51] Int. Cl.² ............................................. B62D 55/20
[52] U.S. Cl. ...................................... 305/11; 305/57; 305/59
[58] Field of Search ................... 350/11, 14, 57, 58 R, 350/59, 42; 74/254, 257, 251 C, 251 R, 255 R; 308/26, 238

[56] References Cited

U.S. PATENT DOCUMENTS

| 3,492,054 | 1/1970 | Boggs et al. | 305/11 |
| 3,526,441 | 9/1970 | Schulz | 305/42 X |
| 3,838,896 | 10/1974 | Kawamura et al. | 305/11 |
| 3,958,836 | 5/1976 | Brown | 305/14 |

Primary Examiner—Stanley H. Tollberg
Assistant Examiner—John P. Shannon
Attorney, Agent, or Firm—Phillips, Moore, Weissenberger, Lempio & Majestic

[57] ABSTRACT

An endless track assembly comprises a pair of laterally spaced link assemblies each having a plurality of articulated links. Each pair of interconnected links is mounted on the end of a pin having a torsional track bushing mounted thereon. The torsional track bushing includes a metallic sleeve spaced longitudinally from one of the links and an elastomeric-based bushing secured between the metallic sleeve and such link for permitting relative torsional movements therebetween. The elastomeric-based bushing may constitute an annular member entirely composed of an elastomer, an elastomeric member secured on a metallic ring, or a plurality of elastomeric discs interleaved between a plurality of metallic discs.

12 Claims, 5 Drawing Figures

TORSIONAL TRACK BUSHING

BACKGROUND OF THE INVENTION

A conventional endless track assembly for a track-type tractor or the like comprises a plurality of track shoes secured to a pair of laterally spaced articulated link assemblies. Each of the link assemblies comprises a plurality of articulated links with each pair of adjacent links being interconnected by a pin and a bushing. An outer end of the pin is normally secured to the outboard link whereas the bushing is secured to the inboard link whereby the bushing and inboard link are adapted to pivot relative to the pin and outboard link. The bushing constitutes a torsional element which provides a degree of torsional stiffness which gives rise to ancillary problems, such as a scrubbing effect between the bushing and a driving sprocket of the tractor.

The torsional stiffness of the bushing causes the track assembly to be stiff with regard to torsional loads acting about the axis of the link assembly. Such loading is encountered when a track shoe is loaded at an edge thereof. This loading is a major cause of the potential loss of press fit between the bushing and the attached link. In addition, endless track assemblies of this type oftentimes employ a pair of ring seals on the outboard ends of the pins.

SUMMARY OF THIS INVENTION

The present invention is directed to overcoming one or more of the problems as set forth above.

The torsional track bushing of this invention comprises a cylindrical metallic sleeve adapted to be spaced longitudinally from a first link of a link assembly of the type described above and means secured between the metallic sleeve and such first link for permitting relative torsional movements between the metallic sleeve and the first link upon articulation and torsion of the link assembly. Such means may comprise an annular member entirely composed of an elastomer, an annular metallic ring having an elastomeric member secured thereon or a plurality of elastomeric discs having a plurality of metallic discs interleaved therebetween.

BRIEF DESCRIPTION OF THE DRAWINGS

Other objects of this invention will become apparent from the following description and accompanying drawings wherein.

DETAILED DESCRIPTION

Figure 1:
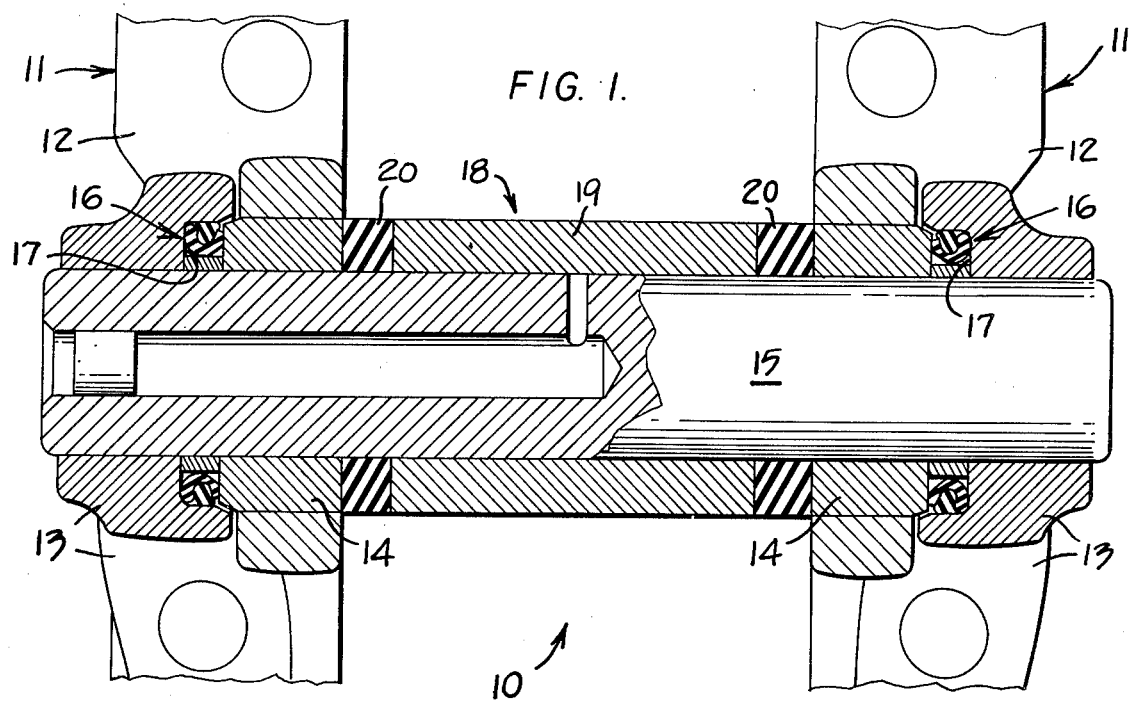
FIG. 1 is a longitudinal sectional view illustrating a torsional track bushing embodying this invention, mounted in an endless track assembly of a track-type vehicle.

FIG. 1 illustrates a track assembly 10 comprising a pair of laterally spaced articulated link assemblies 11 each comprising pairs of articulated first and second links 12 and 13, respectively. Each first or inboard link 12 is press-fitted or otherwise suitably secured on a ring 14, rotatably mounted on a pin 15, to form an integral part thereof. Second or outboard link 13 is press-fitted or otherwise suitably secured on an outer end of the pin.

A conventional sealing means 16 is disposed in an annular recess 17, suitably formed in link 13. A torsional track bushing 18 of this invention is mounted on pin 15 and comprises a cylindrical metallic sleeve 19 having its ends spaced longitudinally from links 12. An elastomeric-based bushing 20 is bonded or otherwise suitably secured to each end of the sleeve and to each ring 14 of first links 12.

Figure 2:
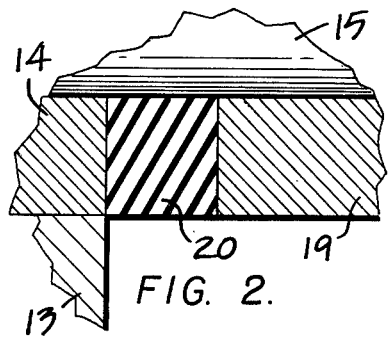
FIG. 2 is an enlarged fragmentary view more clearly showing the torsional track bushing illustrated in FIG. 1.

As shown in FIG. 2, annular bushing 20 is entirely composed of elastomer for permitting relative torsional movements between metallic sleeve 19 and link 12 upon relative articulation of first and second links 12 and 13. Also, the inside and outside diameters of sleeve 19 and bushing 20 are substantially equal. The sleeve preferably has an axial length which is from four to ten times the axial length of the bushing.

Figure 3:
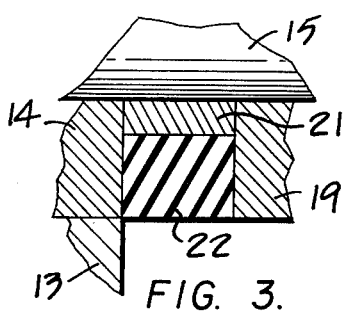
FIG. 3 is a view similar to FIG. 2, but illustrating a modification of the torsional track bushing.
Figure 4:
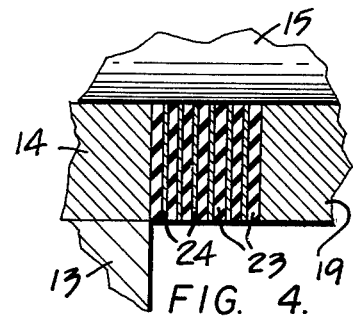
FIG. 4 is a view similar to FIG. 2, but illustrating a further modification of the torsional track bushing.

FIG. 3 illustrates a first modification of the track bushing wherein bushing 20 comprises a metallic ring 21 having an annular elastomeric member 22 secured thereon. FIG. 4 illustrates a second modification wherein the bushing comprises a plurality of elastomeric discs 23 having a plurality of metallic discs 24 interleaved therebetween. These track bushing modifications provide stiffness in an axial direction while remaining substantially "soft" when placed in torsion.

Figure 5:
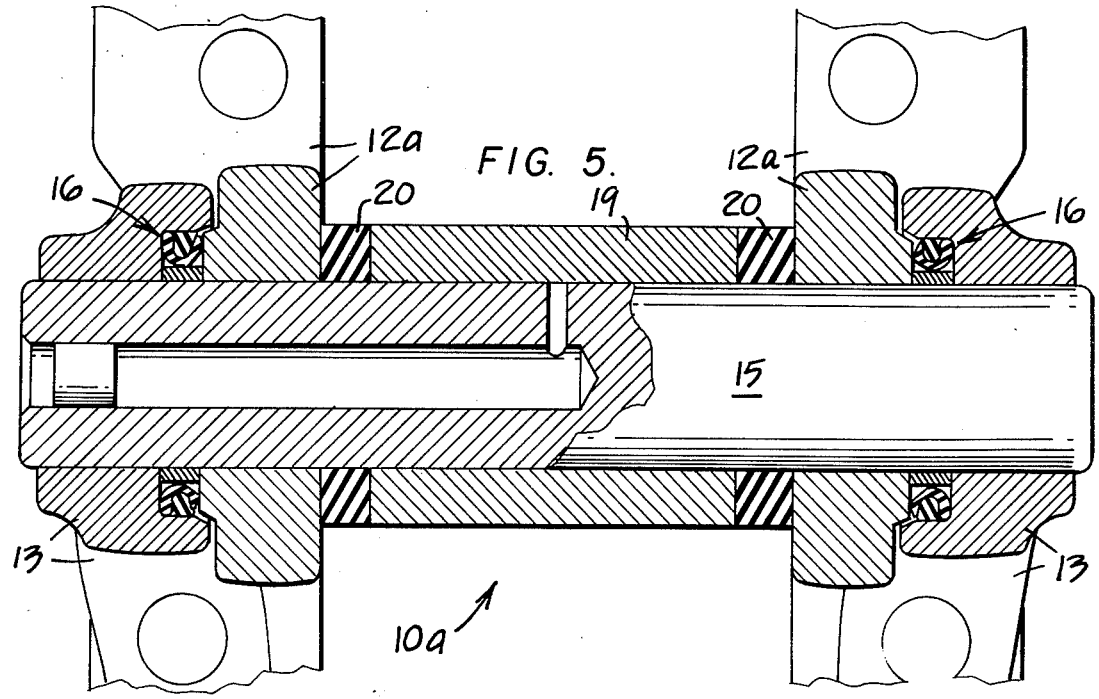
FIG. 5 is a view similar to FIG. 1, but illustrating a modification of the track assembly.

FIG. 5 illustrates a modification 10a of the FIG. 1 track assembly wherein ring 14 has been eliminated and a modified first or inboard link 12a has been mounted directly on pin 15. In this modification, the pin bore formed through link 12a would normally require hardening due to its intimate bearing contact with pin 15.

From the above description, it can be seen that track bushing 18 is substantially eliminated as a torsional element during articulated movement between links 12 and 13 and during rotational movement between links 11 and 12 to thus substantially reduce torsional stiffness of the track assembly. In addition, this arrangement eliminates the need for a press-fit relationship between metallic sleeve 19 and inboard link 12 and also tends to reduce scrubbing between the drive sprocket (not shown) which engages sleeve 19 in driving relationship therewith. In addition, it is contemplated that a quieter sprocket arrangement will be achieved with the torsional track bushing of this invention.

The embodiments of the invention in which an exclusive property or privilege is claimed are defined as follows:

1. In an endless track assembly of the type comprising a pin having a pair of articulated first and second links mounted on each end thereof, the invention comprising a torsional track bushing mounted on said pin for relative pivotal movements and including a cylindrical metallic sleeve spaced longitudinally from each of said first links and means providing the sole securance between said metallic sleeve and each of said first links for permitting only limited relative torsional movements between said metallic sleeve and said first links upon relative articulation of said first and second links.

2. The endless track assembly of claim 1 wherein said means comprises an annular elastomeric-based bushing secured between an end of said metallic sleeve and said first link.

3. The endless track assembly of claim 2 wherein said elastomeric-based bushing constitutes an annular member entirely composed of an elastomeric material.

4. The endless track assembly of claim 2 wherein said elastomeric-based bushing comprises an annular metallic ring mounted on said pin and an annular elastomeric member mounted on said ring.

5. The endless track assembly of claim 2 wherein said elastomeric-based bushing comprises a plurality of elastomeric discs having a plurality of metallic discs interleaved therebetween.

6. The endless track assembly of claim 2 wherein the inside and outside diameters of said metallic sleeve and said elastomeric-based bushing are substantially equal.

7. The endless track assembly of claim 2 wherein said first link comprises a link having an annular ring secured in a bore formed therein and wherein said elastomeric-based bushing is secured to said ring.

8. The endless track assembly of claim 2 wherein said first link is integrally formed as one-piece part and said elastomeric-based bushing is secured directly to said first link.

9. The endless track assembly of claim 1 wherein said second link is secured to an outer end of said pin and further comprising annular sealing means mounted on said pin and disposed axially between said first and second links.

10. The endless track assembly of claim 2 wherein said metallic sleeve has an axial length which is from four to ten times the axial length of said elastomeric-based bushing.

11. In an endless track assembly of the type comprising a pin having a pair of articulated first and second links mounted on each end thereof, the invention comprising a torsional track bushing mounted on said pin for relative pivotal movements and including a cylindrical metallic sleeve spaced longitudinally from a said first link and means secured between said metallic sleeve and said first link for permitting relative torsional movements between said metallic sleeve and said first link upon relative articulation of said first and second links, said means comprising an annular elastomeric-based bushing secured between an end of said metallic sleeve and said first link and wherein said first link comprises a link having an annular ring secured in a bore formed therein and wherein said elastomeric-based bushing is secured to said ring.

12. A track bushing for use in an endless track assembly comprising
 a cylindrical metallic sleeve and
 an annular elastomeric-based bushing secured to each end of said metallic sleeve and adapted to permit limited relative torsional movement of said metallic sleeve when said track bushing is mounted in an endless track assembly, said elastomeric-based bushing comprises a plurality of elastomeric discs having a plurality of metallic discs interleaved therebetween.

* * * * *